United States Patent
Murra et al.

(10) Patent No.: US 6,639,728 B2
(45) Date of Patent: Oct. 28, 2003

(54) OPTICAL SYSTEM FOR HOMOGENIZATION OF LIGHT BEAMS, WITH VARIABLE CROSS-SECTION OUTPUT

(75) Inventors: Daniele Murra, Rome (IT); Sarah Bollanti, Rome (IT); Paolo Di Lazzaro, Grottaferrata (IT)

(73) Assignee: ENEA-Ente per le Nuove Tecnologie, l'Energia e l'Ambiente, Rome (IT)

( * ) Notice: Subject to any disclaimer, the term of this patent is extended or adjusted under 35 U.S.C. 154(b) by 0 days.

(21) Appl. No.: 09/727,268

(22) Filed: Nov. 30, 2000

(65) Prior Publication Data
US 2001/0043399 A1 Nov. 22, 2001

(30) Foreign Application Priority Data
Apr. 28, 2000 (IT) .................................... RM00A0229

(51) Int. Cl.⁷ ................................................ G02B 27/10
(52) U.S. Cl. ..................... 359/623; 359/626; 359/622
(58) Field of Search ............................... 359/621, 622, 359/623, 626, 619; 362/268

(56) References Cited
U.S. PATENT DOCUMENTS
6,577,429 B1 * 6/2003 Kurtz et al. ................ 359/279

2001/0048493 A1 * 12/2001 Swanson et al. ............. 349/62
2001/0055107 A1 * 12/2001 Tsuji .......................... 355/67

FOREIGN PATENT DOCUMENTS
JP      409325313 A * 12/1997 ............. G02F/1/13

* cited by examiner

Primary Examiner—Ricky Mack
(74) Attorney, Agent, or Firm—Samuels, Gauthier & Stevens

(57) ABSTRACT

This invention relates to an optical system for reshaping and spatially homogenizing light beams with variable cross-section output, comprising six optical components, with three components associated to each of two orthogonal transverse directions, wherein the first component operates as a Divider component (D; DO, DV) and is formed by a number n of cylindrical lenses (D1, . . . , Dn), where n is greater than 1, whose total dimension is not greater than the respective dimension of the light beam and whose center point lies upon the optical axis of the light beam, the second component operates as a Condenser component (C; CO, CV) and is formed by a cylindrical lens and the third component operates as a Zoom component (Z; ZO; ZV) and is formed by a cylindrical lens, and wherein, in the case the cylindrical lenses (D1, . . . Dn) have different sizes $s_i$ (i=1, 2, . . . n), the ratio size/focal length $s_i/f_i$ must be constant for every i=1, 2, . . . n.

8 Claims, 1 Drawing Sheet

OPTICAL SYSTEM FOR HOMOGENIZATION OF LIGHT BEAMS, WITH VARIABLE CROSS-SECTION OUTPUT

BACKGROUND OF THE INVENTION

1. Field of the Invention

This invention broadly relates to systems for spatial homogenization of light beams and more particularly to systems for homogenizing such beams, for instance laser beams, while at the same time an output is obtained with variable cross-section.

2. Description of Related Art

As it is well known, in many applications in which high intensity light beams are utilized, for instance laser beams designed for thermal and/or ablative treatments of surfaces, an accurate energy (or power) density on the working spot as well as a very high spatial uniformity are required, in order that any intensity fluctuations be maintained within a limit of 10%.

The radiation emitted by any light source has an intrinsic point to point disuniformity, particularly when a laser radiation is involved, due to the fact that the light beam as emitted by most laser sources has an intensity spatial profile that is not constant along a transversal direction, due to principles related to the physics of the sources of this type. The sole system adapted to enhance the spatial homogeneity of a light source without jeopardizing the emitted energy provides for optically manipulate the concerned light radiation by means of a lens and/or mirror system.

SUMMARY OF THE INVENTION

Many optical systems are commercially available adapted to intercept a light beam having known dimensions and to convert its current dimensions into other dimensions of pre-established values while at the same time they assure a high spatial uniformity, that is low point to point fluctuations of the light intensity.

Most of the existing optical systems adapted to operate in such a way as to make the intensity distribution of the light beam more uniform have the drawback that, when the energy (or power) emitted from the source is established, the final dimensions of the beam and consequently the exploitable energy (or power) density are strictly determined. As a consequence of this, the various applications of light beams with uniform intensity distribution require different dedicated optical systems depending on the desired final dimensions of the light beams.

DETAILED DESCRIPTION OF THE INVENTION

In this sense, the present invention is innovative in view of its flexibility (due to the fact that, even if the parameters of its components are established, it enables the dimensions of the final beam to be varied in a large range of values, so that it can be exploited in application requiring spatial homogeneous light beams having variable dimensions and an arbitrarily selectable energy (or power) density) and also in view of its simplicity (as it requires the smallest number of lenses to achieve the above result).

Moreover, in the following it will be shown that the present system can optimize the correction of local lacks of uniformity of the energy density, thus achieving a better uniformity with respect to that obtained by using homogenizers which only correct the average lack of uniformity.

DESCRIPTION OF THE SUBJECT-MATTER

This invention is based upon the principle that the incident light beam can be divided into a number n of portions of rectangular cross-section by means of an optical system and such portions can be recombined in a suitable plane— the so-called focal plane—where the size of any individual beam portion coincides with the desired final dimensions, by means of two further optical components for each of two transverse directions. This process operates so that each point of the beam on the focal plane is the result of the combination of n different points of the input beam, thereby reducing the initial intensity fluctuations. The use of three optical components for each direction additionally enables the final dimensions of the light beam to be arbitrarily established, regardless of the starting dimensions, by simply modifying the relative distances of the above mentioned components.

The main applications of a spatial homogenizer for light radiation are those based upon the Interaction processes between radiation and matter in which a constant energy (or power) density is desired on the surface to be irradiated, among which, by way of exemplification, the processes for treatment of metals (inclusive of surface cleaning and/or hardening effects) and plastics (inclusive of writing, ablation and sculpturing), microlithographic processes on large areas, metal cladding and also all those processes designed to transfrom the structure of a material (such as the crystallization of amorphous silicon for subsequent utilization in photovoltaic applications and microelectronics) can be mentioned. The latter application has the most rigid requirements in respect of the spatial uniformity characteristics relating to the light energy (or power) density: in fact, intensity fluctuations lower than 5% are required.

The main advantageous characteristics of this invention reside on one hand in the possibility to continuously vary the dimensions of the light beam on the focal plane, so as to enable the desired energy (or power) density (that is inversely proportional to the dimensions of the light beam) to be precisely determined or the dimensions of the light beam to match the dimensions of the irradiated material, while on the other hand in the possibility of correcting the local intensity fluctuations of the input beam, to achieve a better uniformity with respect to that obtained by using existing homogenizers which only correct the lack of uniformity averaged over the whole beam.

SUMMARY

Subject-matter of this invention is a combined optical system comprising six components each consisting of a number of lenses, adapted to transform the cross-section shape of a light beam into another shape having variable dimensions, as well as an enhanced spatial uniformity of the light energy (or power) density such as to enable it to be utilized in all processes requiring restricted intensity fluctuations on a pre-established area, or to realize a light beam having a constant intensity within an area of variable dimensions.

The above mentioned six optical components act on the two transverse directions of the light beam, three components for each axis, and they are so defined: the first component is defined by Horizontal Divider (Vertical Divider, for the other direction); the second component is defined as Horizontal Condenser (Vertical Condenser, for the other direction); and the third component is defined by Horizontal Zoom (Vertical Zoom, for the other direction).

The first component is comprised of a number of lenses (for instance cylindrical lenses), whose number, size and the focal length are to be established as a function of the desired results, while both the second and the third components are single lenses (for instance cylindrical lenses).

Let us consider the simple case when the Horizontal (Vertical) divider is composed by a number of equal lenses. Upon designating with $f_1$ the focal length of the lenses of the first component, with $f_2$ the focal length of the second component, with $f_3$ the focal length of the third component, with d the distance between the second and the third components, with n the number of the lenses constituting the first component and with s the dimension of such lenses in the direction along which the focalization effect is exploited, the optical system operates so as to transform the starting dimension of the light beam in the considered direction, equal to n×s, into a dimension D, where D is defined by the following formula:

$$D = \frac{s}{f_1} \left| \frac{f_2 f_3}{f_3 + f_2 - d} \right|$$

The dimension of the beam reaches a value D at a distance z>0 from the third component according to the following formula:

$$z = \frac{f_3(f_2 - d)}{f_3 + f_2 - d}$$

where the values of $f_2$, $f_3$ and d are to be selected in such a manner as to determine a positive value of z.

Considered of this plane, for a length equal to D, the beam reaches a spatial uniformity of the energy (or power) density that is proportional to the number n of the lenses constituting the first component.

The above outlined system represents a broad arrangement comprising a number of particular cases among which it is possible to mention:

- a case in which the lenses forming the Horizontal and/or the Vertical divider are not equal, that is, they have different sizes $s_i$ (i=1, 2, . . . n). In the case, each lens of the Horizontal and/or Vertical divider must have a focal length $f_1$ such that the ratio $s_i/f_i$ is constant for every i=1, 2, . . . n.
- a case in which the lenses forming the Horizontal Divider and the Vertical Divider are parts of a single system of toroidal lenses or, when the focal length connected with the two directions are identical, spherical lenses (the latter optical component is generally defined as "fly-eye");
- a case in which the lenses forming the Horizontal Condenser and the Vertical Condenser are parts of a single system of toroidal or spherical lenses;
- a case in which the lenses forming the Horizontal Zoom and the Vertical Zoom are parts of a single system of toroidal or spherical lenses;
- a case in which the above mentioned cases occur contemporaneously with spherical lenses: in this circumstance, the optical system operates in such a way that the final dimensions of the light beam fulfill a pre-established proportionality relationship between the two directions.

Further details and advantages of this invention will be evident from the following specification by referring to the enclosed drawings wherein the preferred embodiment is shown by way of illustration and not by way of limitation.

DETAILED DESCRIPTION OF PREFERRED EMBODIMENT

Figure 1:
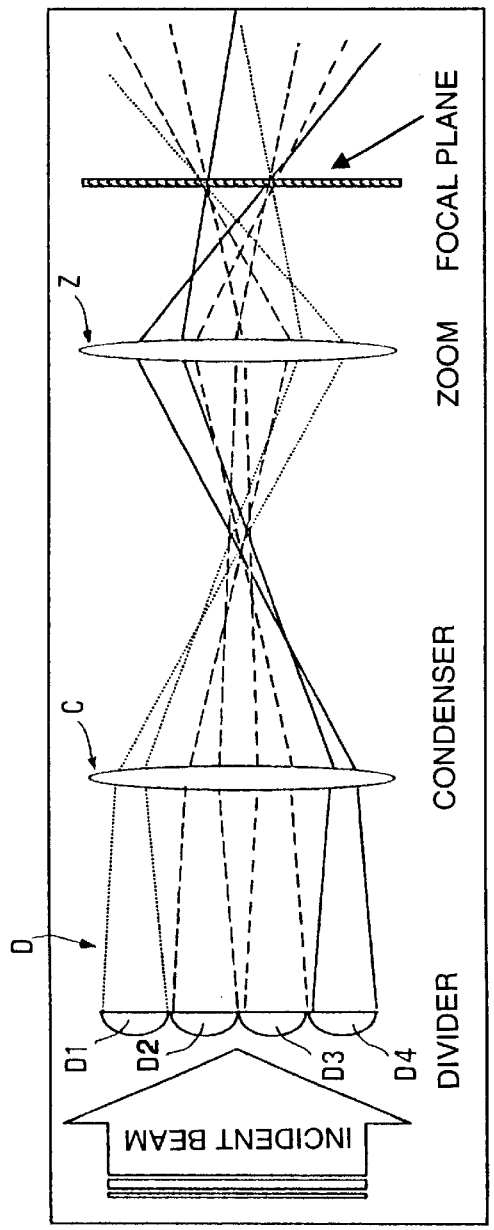
FIG. 1 shows a diagram of a possible arrangement according to this invention, resulting into a homogenization effect on the horizontal plane of the sheet.
Figure 2:
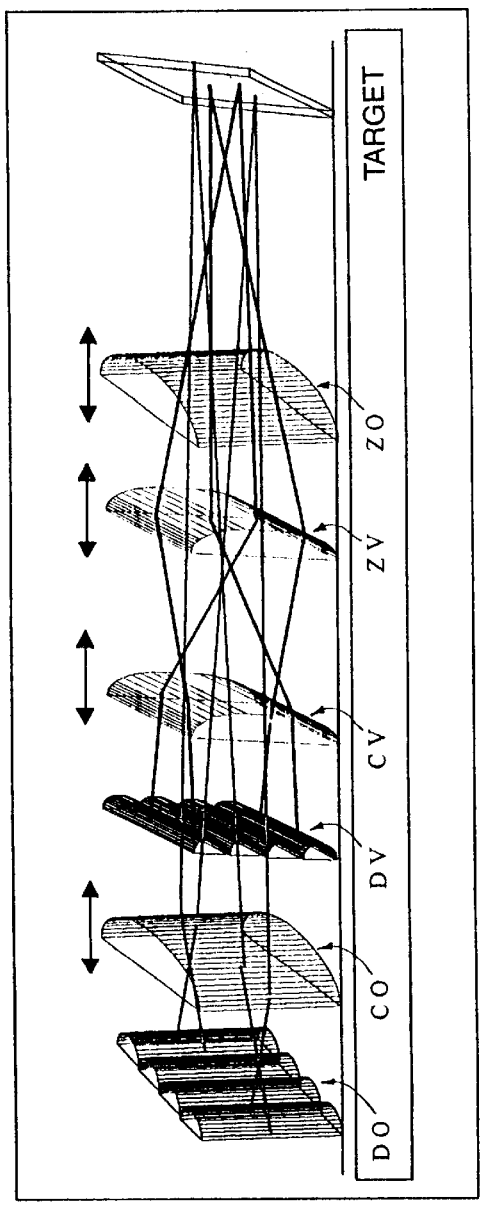
FIG. 2 shows a perspective view of a possible arrangement according to this invention, in which the spatial homogenization is effected in both directions, with output beams having variable cross-sections.

By specifically referring now to the drawings, it can be observed that the present invention comprises three optical components for each of the two orthogonal directions transversal to the propagation direction of the light beam. The following description will illustrate the operation principle that applies to the X direction, in which the concerned beam has a dimension dx, and can be extended to the Y direction, in which the beam has a dimension dy, by suitably exchanging the X and Y variables. FIG. 1 shows a top plan schematic view of an arrangement according to this invention, wherein the light beam travels in left to right direction and it is homogenized in horizontal direction, namely in a direction parallel to the sheet. FIG. 2 shows a perspective view of a possible arrangement according to this invention, in which the spatial homogenization is effected in both directions. In this particular case, the first optical component is comprised of n cylindrical side-to-side arranged lenses, each of which has a height dy and a width s, where s=dx/n (in the Figures, n=4). The global dimensions of the first component are, therefore, equal to the dimensions of the light beam on which the arrangement according to this invention operates and its location will be such that its middle point will be coincident with the propagation axis of the light beam. These lenses are equal with respect to one another and have a focal length equal to $f_1$. This first system of n lenses is aimed at dividing the light beam into n portions and it is designated as Divider (horizontal or vertical, according to the direction along which it operates). The secondary light beams exiting from said fist optical system will be incident on the second optical system that comprises a single cylindrical lens whose optical axis coincides with the propagation axis of the light beam and whose dimensions are such as to collect the whole light exiting from the lenses of the first optical component. This single lens is designated as Condenser. The focal length of this lens is equal to $f_2$ and the distance between this lens and the Divider component is equal to $d_{dc}$. The third optical component is comprised of a further cylindrical lens having its optical axis coincident with the optical axis of the Condenser component and having suitable dimensions for containing the light exiting from the Condenser component as well as a focal length $f_3$. It is designated as Zoom and its distance from the Condenser component is $d_{rc}$. In the above established conditions, at a distance z from the Zoom component, as it will be hereinbelow defined, the above mentioned secondary beams exiting from the divider component will contemporaneously reach the same dimension $D_1$ within two ends that are the same for all of them. The plane at a distance z from said Zoom component is designated as focal plane. Said distance z is defined by the following formula:

$$z = \frac{f_3(f_2 - d_{zc})}{f_3 + f_2 - d_{zc}}$$

(where z>0) and the dimension reached by the light beam is equal to $$D = \frac{s}{f_1}\left|\frac{f_2 f_3}{f_3 + f_2 - d_{zc}}\right|.$$

It evidently appears from the above formulas that, upon establishing the values of the focal length of the three optical components, by suitably modifying the distance $d_{zc}$ between Condenser and Zoom components, it is possible to continuously vary the dimensions of the light beam on the focal plane, where the above mentioned n secondary beams recombine themselves and, therefore, they attenuate the intensity fluctuations of the initial light beam so as to make the spatial distribution uniform.

Since the distance z from the Zoom component varies as $d_{zc}$ is varied, when it is desired that the focal plane of the whole optical system is maintained at the same distance from the Divider component, it is sufficiently to modify the distance $d_{dc}$ in such a manner as to maintain at a constant value $L=d_{dc}+d_{zc}+z$, which is defined as the length of the homogenizer.

Those skilled in the art, of course, will be able to make a number of variations in order to fulfil the requirements of particular circumstances of use or particular needs.

For instance, in the common case of beams having a highly asymmetric disuniformity, it is convenient using a relatively small size s of the Horizontal (Vertical) divider lenses in correspondence to the less uniform energy distribution, and lenses with a relatively large size s' (s'>s) in correspondence to the more uniform energy distribution region. In this way, we can locally optimize the size s depending on the local degree of disuniformity, thus achieving a better uniformity with respect to that obtained using existing homogenizer systems which adapt the size s according to the average beam disuniformity. This modification does affect neither the equation predicting the distance z between the zoom lens and the focal plane, nor the equation predicting the beam dimension D on the focal plane, provided that each lens of the Horizontal and/or Vertical divider has a focal length $f_1$ such that the ratio $s_i/f_1$ is constant for every i=1,2, . . . n.

In a different embodiment, all horizontal and vertical Divider components can be formed by a single element adapted to contemporaneously operate in both directions and consisting of a number of toroidal or spherical lenses higher than 1 for each direction. Correspondingly, the horizontal and vertical Condenser components as well as the horizontal and vertical Zoom components can be respectively formed by a single toroidal or spherical lens.

Those skilled in the art will immediately appreciate that some components can be formed by negative focal lenses or divergent lenses.

In a different embodiment, some optical components can be reflective rather than refractive components and in this case the optical axis of the Condenser and Zoom components can also be not coincident with the propagation axis of the light beam incident on the divider component.

In a further different embodiment, an attenuator component adapted to continuously vary the light power can be added to the refractive components (lenses) and/or reflective components (mirrors), in order to enable the optical system to vary the dimensions of the light beam, while its energy (or power) density is maintained by suitably operating said attenuator.

In a further different embodiment, a spatial filtering system, for instance comprising slits, or holes in the case of a fly-eye divider, can be located in the planes where the secondary beams exiting from the horizontal and/or vertical divider are possibly focused, such spatial filtering system being adapted to prevent any diffractive or interferential effects on the focal plane of the homogenizer.

As a confirmation of the efficiency of this optical system, a unidimensional prototype has been realized and its performances have been analyzed by means of suitable measurement instruments. Said prototype is formed by a Divider component comprising two lenses having a total width of 2.5 cm (so that each lens of the Divider has a width of 1.25 cm). The focal length of the lenses forming the Divider component is of 50 cm, the focal length of the Condenser component is of 45 cm and the focal length of the Zoom component is of 8 cm.

The concerned optical system has been illuminated by the light generated by a He—Ne laser, with a gaussian intensity spatial profile having a half-width of about 3 cm. By application of the equations above described, it has been possible to position the lenses of the Condenser and Zoom components in such a manner as to obtain a homogeneous beam having a width variable in a range of 6 to 45 mm, with a zooming factor of 7.5.

The distance between the Condenser and the Zoom components has been adjusted a first time at a value of 68 cm, so as to obtain a focalization at about 12 cm from the Zoom component with a beam basewidth of 6 mm, and a second time at a value of 55 cm, so as to obtain a focal plane at a distance of 40 cm from the Zoom component and a final basewidth of 45 mm. The whole dimension of the prototype apparatus, as measured from the Divider component to the focal plane, has been maintained within a distance of about 1 m.

The measurement of the final dimensions of the homogenized beam has been effected by means of a semiconductor photodetector arranged upon a remotely controlled slide. The slide is controlled by a Personal Computer which provides for contemporaneously acquiring the position of the detector and its electrical signal, which is proportional to the intensity of the incident light. By moving the photodetector along a path extending in the direction in which the light beam is homogenized, a curve (light intensity versus position) can be drawn from which the spatial intensity distribution of the beam and consequently its dimension can be derived.

The so realized optical system, therefore, transforms the 25 mm wide central part of a gaussian beam into a beam having a plane profile (with an intensity fluctuation of less than 10%) with a basewidth variable in the range of 6 to 45 mm. Furthermore, in the 45 mm case, a simulation program purposedly realized for theoretically studying this optical system forecasts that, by moving the measurement plane beyond the focal plane resulting from the equations, the beam ought still to be homogeneous and to have a greater extension. Such forecast has been confirmed by the above prototype apparatus; in fact, when the distance between the Condenser and Zoom components is adjusted at a value of 55 cm and the measurement plane is displaced up to 56 cm from the Zoom component, namely 16 cm beyond the theoretical focal plane, the beam remains uniform and has a basewidth equal to about 70 mm (with a zooming factor of about 12).

The above prototype apparatus, therefore, perfectly confirms the theoretical data defining the efficiency of such optical device.

The characteristics of the prototype apparatus have been checked only in respect to a limited fraction of its capability due to the fact that only a Zoom lens of small dimensions was available (about 3 cm width). With the other optical components unchanged and a Zoom component lens of at least 5 cm, the homogenized beam could vary at the base from 2.3 mm up to 18 cm, with a zooming factor of 78. By use of the simulation program, it is also possible to ascertain that, in the configuration in which the beam reaches a dimension of 18 cm, by displacing the measurement plane beyond the focal one, a homogeneous beam of over 30 cm could be obtained, with a zooming factor higher than 130.

The hereinbelow set forth examples evidence the operation of this invention when the parameters of the light beam to be processed are determined.

EXAMPLE 1

It is assumed that a light beam be available with a dimension of 6 cm in the horizontal direction and that it is to be transformed into a beam of 10 cm in the focal plane that is spaced from the Divider component by no more than 100 cm. In this way D=10 cm minimum and L=100 cm maximum are defined. Assuming that the spatial intensity of the concerned light beam has a low fluctuation, the DIVIDER component can be comprised of n=3 lenses and s=2 cm can be defined. At this point, the focal lengths of the lenses resulting into many freedom degrees are to be established. With the following parameters $f_1=10$ cm, $f_2=100$ cm, $f_3=100$ cm and $f_{zc}=2$ cm, it can be obtained, for instance, $$z = : \frac{f_3(f_2 - d_{zc})}{f_3 + f_2 - d_{zc}} = \frac{100 \cdot (100 - 2)}{100 + 100 - 2} = 49.5 \text{ cm}$$

and $$D = \frac{s}{f_1} \left| \frac{f_2 f_3}{f_3 + f_2 - d_{zc}} \right| = \frac{2}{10} \cdot \frac{100 \cdot 100}{100 + 100 - 2} = 10.1 \text{ cm.}$$

Given a distance $d_{dc}$ equal to 48.5 cm, the length of the homogenizer appears to be $(d_{dc}+d_{zc}+z)=100$ cm. These results can be obtained also by a conventional homogenizer comprising only two optical components (Divider and Condenser), but this invention enables the final dimension D to be varied up to a maximum value of 17.4 cm by simply establishing $d_{dc}=2$ cm and $d_{zc}=85$ cm. In this case, z=13 cm and, consequently, the length of the homogenizer remains unaltered.

On the other hand, should a dimension on the focal plane of a maximum value 10 cm be required, but it is also desired it to be amenable to be decreased, rather than increased, with the following parameters $f_1=18$ cm, $f_2=98$ cm, $f_3=80$ cm, by setting $d_{dc}=2$ cm and $d_{zc}=96$ cm, we would obtain D=10.6 cm, while by setting $d_{dc}=54.4$ cm and $d_{zc}$ 0.2 cm, we would obtain D=4.95 cm, even when the total length of the homogenizer is maintained equal to 100 cm.

EXAMPLE 2

A light beam of 6 cm, a Divider component comprising three lenses and a focal plane spaced from the Divider component by 100 cm are again assumed. By setting the focal lengths $f_1$, $f_2$ and $f_3$ equal to 8 cm, 100 cm and 45 cm, respectively, the minimum dimension obtainable on the focal plane is 8 cm and the maximum one is 24 cm, which means that an optical system according to this example assures a variability of 300% for the final linear dimensions of the light beam and consequently a variability up to 900% for the energy (or power) density.

EXAMPLE 3

A light beam of 6 cm dimension and a Divider component comprising three lenses are considered. It is assumed that the focal length of the three lenses be $f_1=12$ cm, $f_2=20$ cm and $f_3=-10$ cm, the latter being a divergent lens. The minimum dimension obtainable at a distance of 1 m from the Divider component is 4 cm, while the maximum dimension is about 32 cm, while a zooming factor of 800%.

The above Examples have been illustrated under the assumption of a beam of identical dimension and a Divider component comprising three lenses in all examples, but the same considerations apply to any other situation. These examples evidence the versatility of the optical system according to this invention, since it enables a noticeable freedom to be reached in selecting the final dimension of the light beam.

The capability of this invention to make the intensity distribution of the light beam uniform on the focal plane is additionally assured by its operation principle which is based upon a subdivision of the beam into a number of portions and upon their subsequent recombination. When the parameters set forth in example 1 are utilized, namely $f_1=10$ cm, $f_2=100$ cm, $f_3=100$ cm and s=2 cm, in a situation in which the light beam incident on the optical system has an intensity distribution of gaussian type, with a width greater than or equal to 6 cm, the resulting beam on the focal plane would have an intensity distribution characterized by fluctuations having a variance lower than 2%. Should the intensity profile be not very regular, it is anyway possible to decrease the intensity fluctuations by suitably increasing the number of lenses forming the Divider component and by consequently selecting the focal lengths of the illustrated three optical components according to this invention.

The above illustrated examples, involving a single transverse direction, can be also extended to the other direction, so that, by suitably adjusting the distances $d_{dc}$ and $d_{zc}$ of the optical components independently operating along the two orthogonal directions, the dimensions of the recombined beam on the focal plane can vary both horizontally and vertically, with fixed total length of the optical system.

The preferred embodiments of this invention have been described and a number of variations have been suggested hereinbefore, but it should expressly be understood that those skilled in the art can make other variations and changes, without so departing from the scope thereof.

What is claimed is:

1. An optical system for re-shaping and spatially homogenizing light beams with variable cross-section output, comprising two sets of optical elements, said sets operating on mutually orthogonal transverse directions, each set being formed by three optical components in which the first component is first met by the light beam and is a Divider component, the second component is met by the light beam after exiting from said Divider component and is a Condenser component having a focal plane and the third component is met by the light beam after exiting from said Condenser component and is a Zoom component; wherein said Divider component is formed by a number n of cylindrical lenses, where n is greater than 1, each cylindrical lens having a size si (with i=1, 2, . . . n), whose total dimension is not greater than the respective dimension of the light beam and whose middle point lies upon the optical axis of the light beam and, in the case said cylindrical lenses have different sizes si (with i=1, 2, . . . n) the size/focal length ration si/fi must be constant for every i=1, 2, . . . n; the second component is formed by a cylindrical lens located before or after the focal plane of the Condenser component.

2. The optical system according to claim 1, wherein the Divider horizontal and vertical components are formed by a single component contemporaneously operating in the two directions, such component being comprised of a number of toroidal or spherical lenses greater than 1 for each direction.

3. The optical system according to claim 1, wherein the Condenser horizontal and vertical components are formed by a single toroidal or spherical lens.

4. The optical system according to claim 1, wherein the Zoom horizontal and vertical components are formed by a single toroidal or spherical lens.

5. The optical system according to claim 1, wherein some components are formed by divergent lenses having a negative focal length.

6. The optical system according to claim 1, wherein some or all of the optical components are reflective components and wherein the optical axes of the Condenser (C; CO, CV) and Zoom (Z; ZO, ZV) components can be not-coincident with the propagation axis of the light beam inciding on said Divider component.

7. The optical system according to claim 1, wherein an attenuator component adapted to continuously vary the light power can be added to the refractive components and/or reflective components, in order to enable the optical system to vary the dimensions of the light beam, while its energy or power density is maintained by suitably operating said attenuator.

8. The optical system according to claim 1, wherein a spatial filtration system comprising slits, or holes, in the case of a fly-eye Divider component, can be located in the planes where the secondary beams exiting from the horizontal and/or vertical Divider component are possibly focused, such spatial filtration system being adapted to prevent any diffractive or interferential effects on the focal plane of the homogenizer.

* * * * *